Patented May 28, 1929.

1,715,209

UNITED STATES PATENT OFFICE.

HERBERT NEWALL MORRIS, OF MANCHESTER, ENGLAND.

PRINTING INK FOR PRODUCING DESIGNS ON RUBBER OR OTHER LIKE MATERIALS.

No Drawing. Application filed August 8, 1928, Serial No. 298,390, and in Great Britain May 3, 1927.

These improvements refer to a new or improved method of producing designs, and particularly in colours, on rubber and other materials penetrable by volatile solvents but otherwise non-absorbent, examples of such other materials being nitro-cellulose, acetyl-cellulose, or the product sold under the registered trade mark "Celophane", and phenol-formaldehyde and casein-formaldehyde condensation products, in the form of sheets, and on fabrics the fibres of which or their protective coatings, are penetrable by solution and also on proofed fabrics.

The object of this invention is primarily to adapt the known photogravure process of printing to the said non-absorbent materials, the printing being effected by an intaglio etched metallic plate or roller, and the colour being deposited from the cavities in the metal of the plate or roller.

According to the invention, in printing or other processes for producing designs in one or more colours on rubber, cellulose or other materials or fibres penetrable by solution, the ink comprises a solution of a suitable colour dissolved in at least one aromatic hydrogenated product with or without other solvents miscible therewith.

The expression "aromatic hydrogenated product" includes the aromatic hydrogenated products of phenol, naphthaline or naphthol of their isomers or esters and the term "colour" includes a colour base or bases or fatty acid salt or salts of the colour. The solution of colour is applied to the etched plate and printed upon the rubber or other material in like manner to ordinary single colour printing upon paper or like absorbent material.

The solvents are selected to suit the material to be printed. In the case of rubber, solvents such as tetrahydronaphthaline, dekahydronaphthaline, cyclo-hexanone, or hydrogenated naphthol may be used, and either singly or in combination.

The organic colours or colour-bases must be soluble in, or their solvent must be miscible with the solvent or solvents for penetrating the surface of the material to be printed.

When in sheet form, the rubber may be backed with canvas to prevent stretching during the operation of printing, and the pressure of the machine reduced to a minimum.

The rubber may be vulcanized before printing, in which case the penetration of the solvents and colours will be comparatively slight, or it may be unvulcanized and after the printing be passed through a drying chamber or oven for vulcanization, the rubber mixture being vulcanizable at a low temperature so as not to destroy the colours and no accelerator being used which has a deleterious effect on the colours.

In printing on nitro-cellulose and acetyl-cellulose, the colour or colour-base is dissolved in a solvent or mixture of solvents, which will also penetrate the surface of the cellulose and quickly volatilize. For this purpose, cyclo-hexanone, hydrogenated naphthol, are suitable and may be used alone, or mixed with other solvents such as methyl-ethyleneglycol or diacetone-alcohol, which may not alone be solvents of nitro- or acetyl-cellulose. By selection of the solvents a slow or quick evaporation may be obtained and thus the speed of drying may be regulated as desired.

No solvent must be used which has any action upon the etched metallic plates and therefore all chlorinated hydrocarbons and acetic acid are to be avoided.

The use of mineral or pigment colours is to be avoided as the nonabsorbent material such as sheets of rubber, cellulose, phenol-formaldehyde and the like, being non-absorbent as paper is, the insoluble mineral or pigment colour remains on the surface and is easily removed by rubbing or washing. Moreover, the cells of the finely etched plates are adversely affected by mineral matter.

By this invention it is possible to carry out on rubber, celluloid, and other penetrable sheets, multi-colour photogravure effects, and by printing in yellow and superimposing upon this red, and then blue, the most beautiful multi-colour effects are produced.

In some cases, especially when high boiling solvents are used it is necessary to apply heat to the sheets after passing through the photogravure machine. This may be done by any known device such as a hot air fan. In the case of tricolour pictures, care must be taken that the yellow print is dry before the red print is super-imposed and this in turn must be dry before the blue is super-imposed to produce the multi-colour effects.

The surface of the rubber, celluloid, etc., may be either dull or polished and in the case of highly polished transparent nitro-cellulose and acetyl-cellulose the effects of multi-coloured stained glass are obtained.

Although preferring the intaglio method of printing, it will be understod that the positive method may be employed, and that black and white, or like one-colour effects may be produced by this invention.

The following are examples of solutions for use according to the invention, given in parts by weight.

*Examples 1 to 4 for use on rubber.*

(1) 20 parts toluol.
    20 parts cyclo-hexanone.
    1 part spirit fast yellow O, of the I–G Dyestuffs Ltd.
(2) 10 parts tetra hydronaphthol.
    10 parts dekahydronaphthaline.
    20 parts toluol.
    2 parts auramine base.
    4 parts stearin.
(3) 15 parts benzol.
    15 parts cyclo-hexanone.
    10 parts tetra hydronaphthol.
    2 parts rosazeine.
    4 parts stearin.
(4) 10 parts xylol.
    10 parts tetrahydronaphthaline.
    1 part Victoria-blue base.
    2 parts stearin.

*Examples 5 and 6 for use in nitro-cellulose.*

(5) 10 parts acetone.
    10 parts cyclo-hexanone.
    5 parts methylated spirit.
    1 part methyl violet base.
    2 parts stearin.
(6) 10 parts acetone.
    10 parts butyl alcohol.
    5 parts tetrahydronaphthaline.
    1 part malachite green base.
    2 parts stearin.

*Example 7, 8 and 9 for use on nitro-cellulose or acetyl-cellulose.*

(7) 20 parts acetone.
    15 parts tetrahydronaphthaline.
    15 parts methylethyleneglycol.
    1 part spirit soluble induline.
(8) 20 parts methylethyleneglycol.
    20 parts toluol.
    1 part nigrosine base.
    10 parts tetra hydronaphthol.
    2 parts stearin.
(9) 20 parts diacetonealcohol.
    20 parts xylol.
    10 parts tetra hydronaphthol.
    1 part magenta base.
    2 parts stearin.

In the examples using a colour base this is mixed with sterin to form the fatty acid salt of the colour before adding to the other ingredients.

What I claim is:—

A printing ink for producing designs in one or more colours on rubber, celluloid or other materials or fibres penetrable by solution, comprising 20 parts acetone, 15 parts tetrahydronaphthaline, methylethyleneglycol and one part spirit soluble induline.

In testimony whereof I have signed my name to this specification.

HERBERT NEWALL MORRIS.